US012754423B2

(12) United States Patent
Ouderkirk et al.

(10) Patent No.: US 12,754,423 B2
(45) Date of Patent: Oct. 6, 2026

(54) HIGH-CONTRAST PANCAKE LENS WITH PASS-POLARIZATION ABSORBER

(71) Applicant: Meta Platforms Technologies, LLC, Menlo Park, CA (US)

(72) Inventors: Andrew John Ouderkirk, Kirkland, WA (US); Fenglin Peng, Redmond, WA (US); Ying Geng, Clyde Hill, WA (US); Brian Wheelwright, Sammamish, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 327 days.

(21) Appl. No.: 18/420,128

(22) Filed: Jan. 23, 2024

(65) Prior Publication Data

US 2024/0255758 A1 Aug. 1, 2024

Related U.S. Application Data

(60) Provisional application No. 63/482,400, filed on Jan. 31, 2023.

(51) Int. Cl.
*G02B 27/01* (2006.01)
*G02B 5/00* (2006.01)
*G02B 5/30* (2006.01)

(52) U.S. Cl.
CPC ......... *G02B 27/0172* (2013.01); *G02B 5/003* (2013.01); *G02B 5/3058* (2013.01); *G02B 5/3083* (2013.01); *G02B 2027/0178* (2013.01)

(58) Field of Classification Search
CPC .... G02B 5/003; G02B 5/3083; G02B 5/3025; G02B 5/3033; G02B 5/3058; G02F 1/133536; G02F 1/13363; G02F 1/133638; G02F 1/133528; G02F 1/133548
See application file for complete search history.

(56) References Cited

U.S. PATENT DOCUMENTS

| | | | | |
|---|---|---|---|---|
| 10,474,229 | B1 * | 11/2019 | Gollier | G02B 27/141 |
| 2005/0111101 | A1 * | 5/2005 | Dike | G02B 27/28 359/489.07 |
| 2020/0096817 | A1 | 3/2020 | Richards et al. | |
| 2020/0341268 | A1 * | 10/2020 | Amirsolaimani | G02B 5/3083 |
| 2022/0179211 | A1 * | 6/2022 | Peng | G02B 6/005 |
| 2022/0350148 | A1 | 11/2022 | Ouderkirk et al. | |

OTHER PUBLICATIONS

International Preliminary Report on Patentability for International Application No. PCT/US2024/013605, mailed Aug. 14, 2025, 8 pages.
International Search Report and Written Opinion for International Application No. PCT/US2024/013605, mailed May 23, 2024, 11 pages.

* cited by examiner

*Primary Examiner* — Jia X Pan
(74) *Attorney, Agent, or Firm* — Greenberg Traurig, LLP

(57) ABSTRACT

A device may include an optical system that creates an image to a user and a light-absorbing element that absorbs a portion of the light transmitted by the optical system. The optical system may include a beamsplitting element and a reflective polarizer that reflects a first handedness of circularly polarized light and transmits a second handedness of polarized light. Various other devices, systems, and methods of manufacture are also disclosed.

20 Claims, 12 Drawing Sheets

700

800

900

HIGH-CONTRAST PANCAKE LENS WITH PASS-POLARIZATION ABSORBER

CROSS REFERENCE TO RELATED APPLICATION

This application claims the benefit of U.S. Provisional Application No. 63/482,400, filed 31 Jan. 2023, the disclosure of which is incorporated, in its entirety, by this reference.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
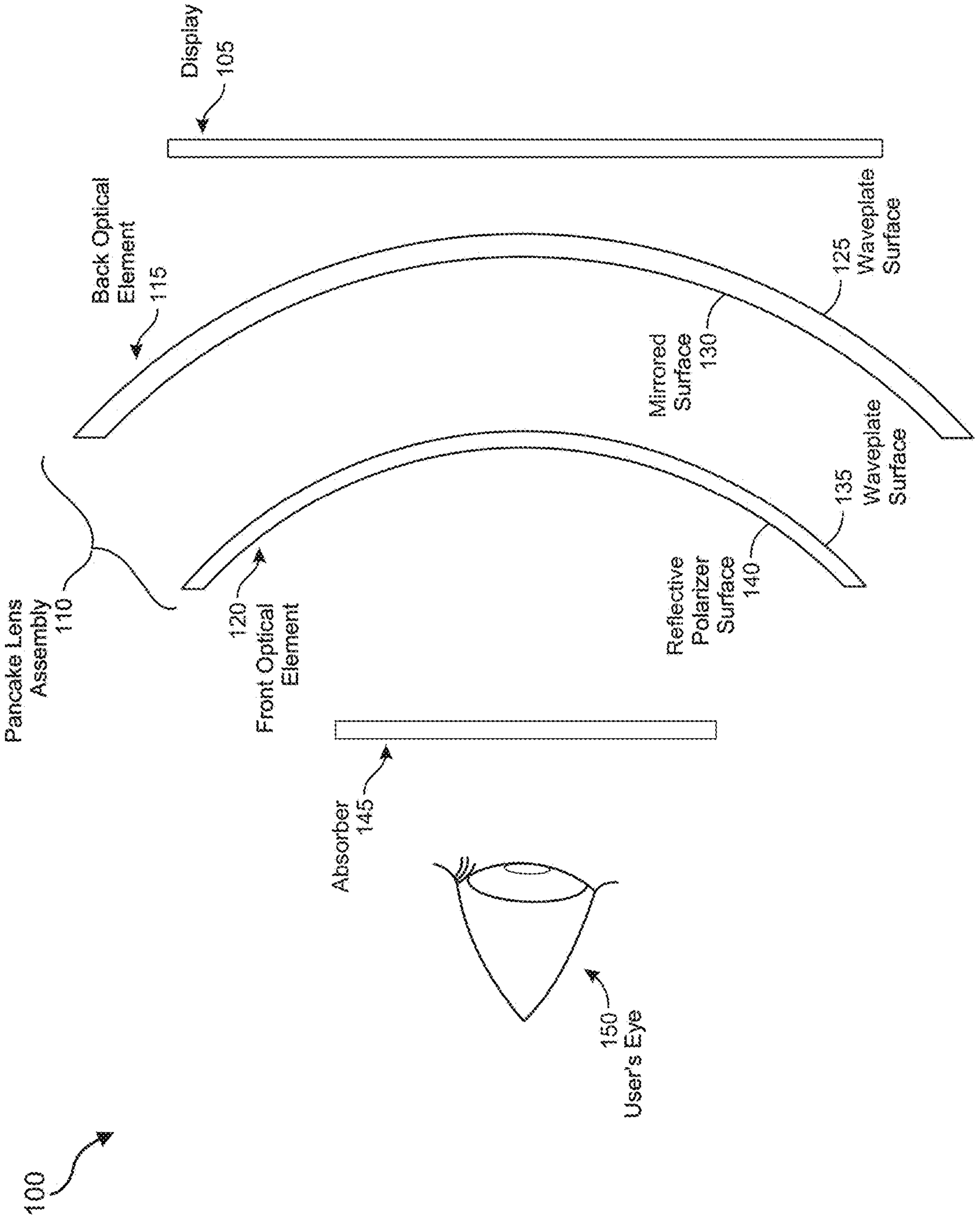
FIG. 1 shows a schematic of an example high-contrast pancake lens with pass-polarization absorber.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Pancake lenses can be compact, lightweight, have a wide field of view, and have high resolution. In some applications, such as head-mounted displays for virtual reality and augmented reality, the use of pancake lenses may contribute to an increased sense of immersion, to greater user comfort, and/or to more design possibilities. However, display contrast may be reduced by pancake lenses due to the reflection of light from the user's eye and surrounding areas (e.g., light from the original display or from the environment), some of which may be reflected back to the user by the pancake lens. This light reflected back to the user may form ghost images, reduce general image contrast, or both.

The present disclosure is generally directed to pancake lenses with pass-polarization absorbers. By placing a light-absorbing element between the user's eye and the display (e.g., between the user's eye and the pancake lens), light reflected from the user's eye or face may be absorbed rather than reflected back to the user. In one case, the light absorbing element may selectively absorb wavelengths that are not generated by the display, thereby eliminating contrast reduction and ghosting caused by environmental light. In another case, the light absorbing element may absorb a portion of light of wavelengths that are generated by the display—in this case, the benefit of the absorber may outweigh the transmission loss from the display that it causes as the absorber may absorb light from the display on only one pass whereas it may absorb light reflected from the user's eye (and, e.g., regions of the user's face surrounding the user's eye) and back to the user on at least two passes.

By absorbing light reflected from the user (and thereby preventing the light from being reflected back to the user), the devices and systems described herein may reduce potential causes of image degradation, such as ghost images and reduced contrast. In the context of VR/AR systems, this may improve user immersion and experience.

FIG. 1 shows a schematic of a device 100 with a high-contrast pancake lens. As shown in FIG. 1, device 100 may include a pancake lens assembly 110. Pancake lens assembly 110 may include a back optical element 115 (e.g., a lens) and a front optical element 120 (e.g., a lens). In some examples, back optical element 115 may include a waveplate surface 125 and a mirrored surface 130. Front optical element 120 may include a waveplate surface 135 and a reflective polarizer surface 140. Light emitted from display 105 may pass through pancake lens assembly 110, following a folded optical path, and reach a user's eye 150.

As may be appreciated, in some examples, light from display 105 and/or from the environment may reflect from user's eye 150 (or another part of the user's face), and toward pancake lens assembly 110. Ordinarily, some of this light reflected from the user may be in a polarization state such that it passes through the reflective polarizer surface 140 and may be reflected back toward the user (e.g., by mirrored surface 130). However, absorber 145 may absorb the light reflected from user's eye 150 (e.g., when reflected from user eye 150 toward pancake lens assembly 110 and/or when reflected from pancake lens assembly back toward user eye 150). Accordingly, any interference otherwise caused by light reflecting from user's eye 150 to the image of display 105 may be mitigated.

Figure 2:
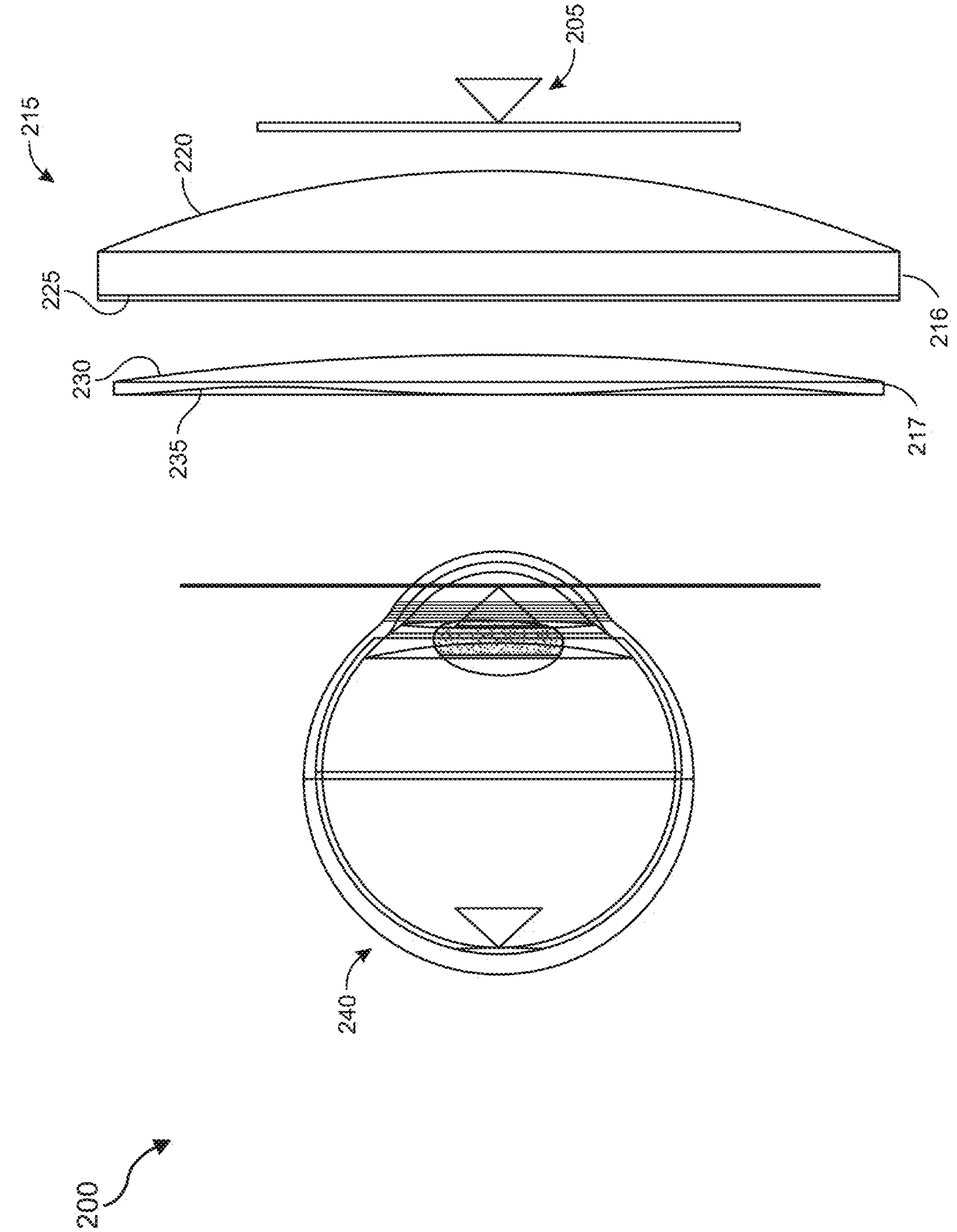
FIG. 2 illustrates an example high-contrast pancake lens with pass-polarization absorber.

FIG. 2 illustrates a device 200 with a high-contrast pancake lens. As shown in FIG. 2, device 200 may include a pancake lens system 215. Pancake lens system 215 may include a lens 216 and a lens 217. Pancake lens system 215 may also include a partially transparent, partially reflective coating 220 and a retarder 225 (e.g., adjacent and/or coupled to lens 216). Pancake lens system 215 may also include a reflective polarizer 230 and an absorber 235 (e.g., adjacent and/or coupled to lens 217).

In some examples, absorber 235 may have a high absorptivity for at least the wavelengths of light not emitted by display 205. For example, absorber 235 may have a higher absorptivity for at least one wavelength of light not emitted by display 205 than for any wavelengths of light emitted by display 205. In some examples, for light in the pass-polarization state, the absorber may have a higher optical transparency for wavelengths emitted by display 205 than for photoptically weighted white light (PWWL). For example, the percentage increase of absorbance of pass-polarization PWWL over that of pass-polarization light of display wavelengths, may be 10% or more, 20% or more, 50% or more, 100% or more, 200% or more, or 500% or more.

In this manner, absorber 235 may reduce or eliminate ghosting and/or contrast reduction caused by environmental light. In some examples, absorber 235 may also absorb wavelengths of light that are emitted by display 205. In various examples, absorber 235 may be a pass-polarization axis absorber and may preferentially attenuate light that is reflected from the user's eye and/or facial regions relative to the attenuation of signal light (e.g., from display 205) forming images for the user. In various examples, the contrast ratio of device 200 may exceed 500:1, may exceed 1000:1, and/or may exceed 2000:1.

Figure 3:
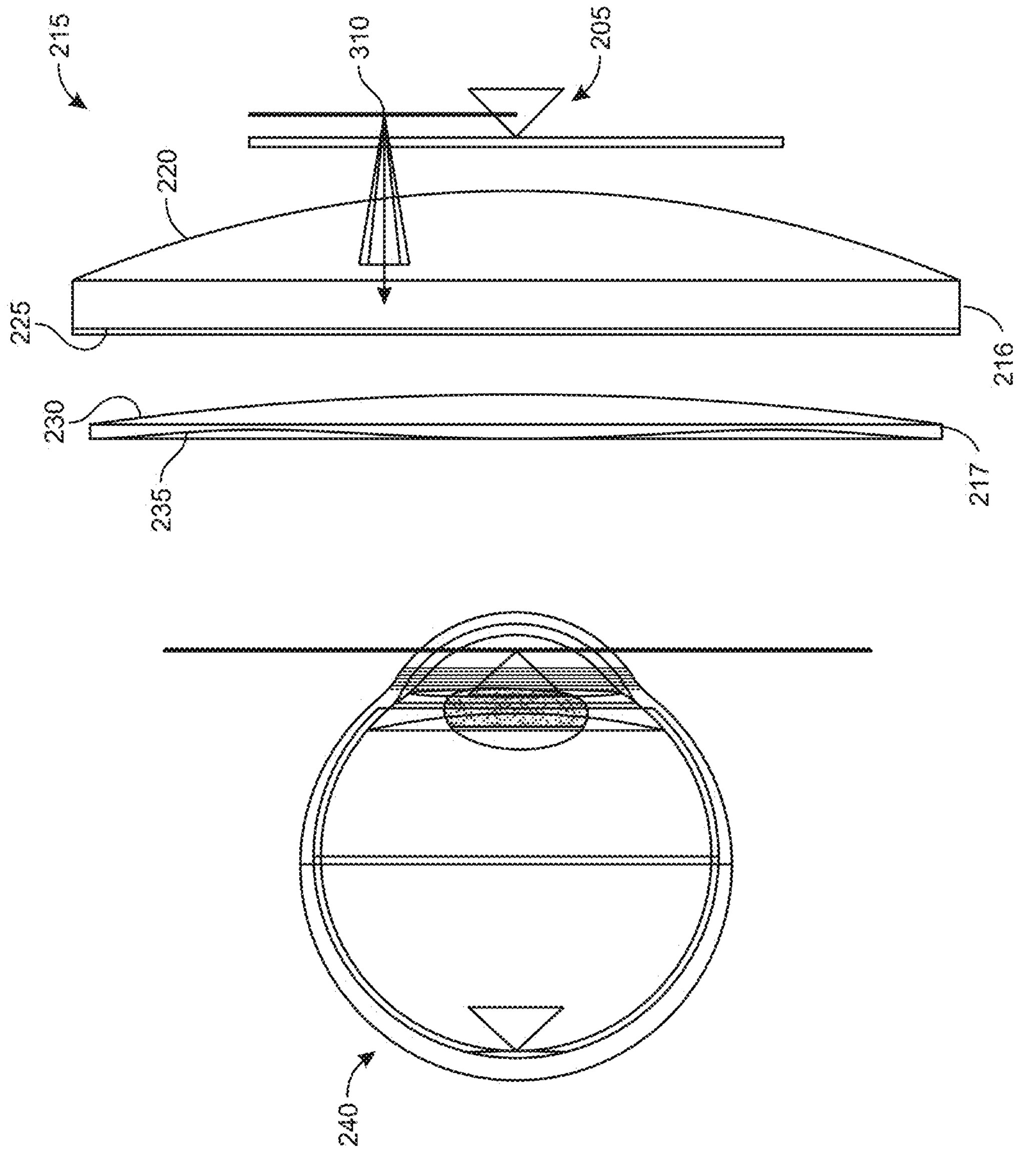
FIG. 3 illustrates an example emission from a display passing through the high-contrast pancake lens with pass-polarization absorber of FIG. 2.

FIG. 3 illustrates an example emission 310 from display 205 passing through device 200 with the high-contrast pancake lens with pass-polarization absorber shown in FIG. 2.

Figure 4:
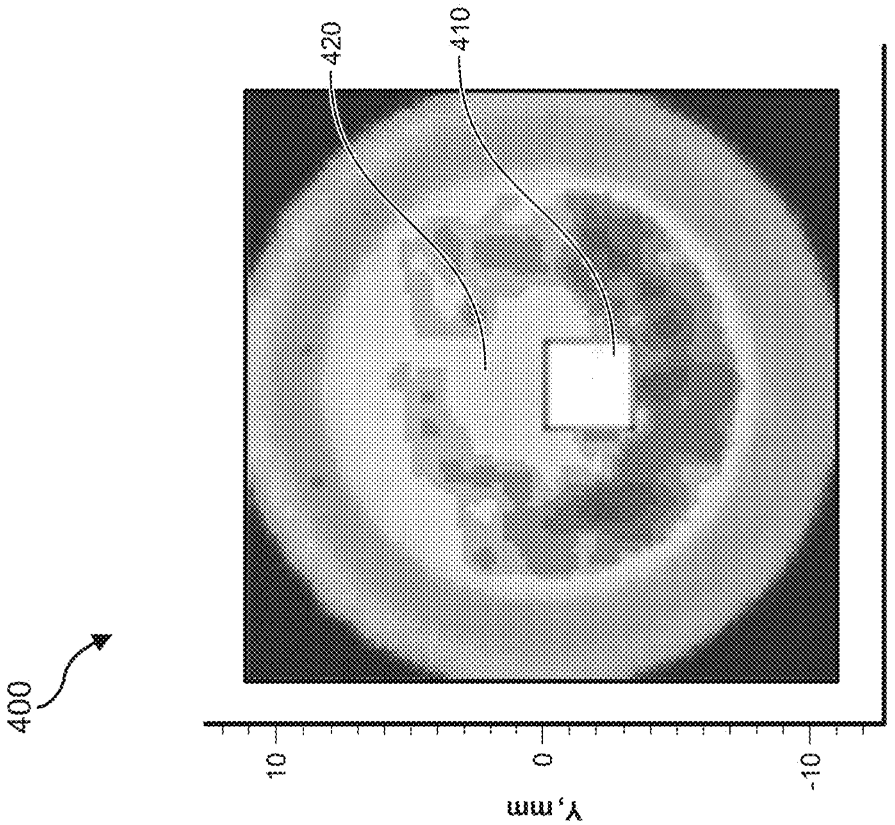
FIG. 4 illustrates an example image formed at a user's retina from the example emission of FIG. 3.

FIG. 4 illustrates an example image formed at a user's retina from the example emission of FIG. 3. In one example, the region of emission 310 on display 205 may be 2 by 2 millimeters. As shown in plot 400 of FIG. 4, an image 410 from emission 310 may form at the user's retina. Non-image light may be shown by the irradiance of area 420 (e.g., the area outside image 410). In some examples, the background light may be about 1% of emission 310, providing a contrast ratio of about 100:1.

Figure 5:
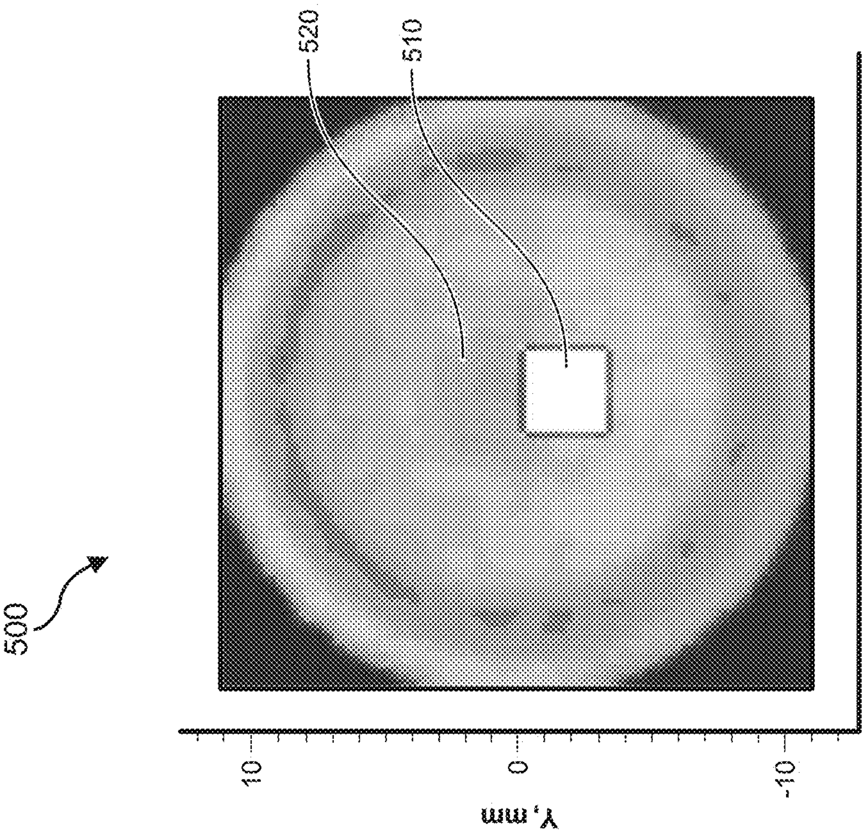
FIG. 5 illustrates another example image formed at a user's retina from a modified version of the example emission of FIG. 3.

FIG. 5 illustrates another example image formed at a user's retina from a modified version of the example emission of FIG. 3. In this example provided in FIG. 5, emission 310 may be about 33.3% brighter than in the example given in FIG. 4. In this example, the absorber (e.g., absorber 235) may absorb 25% of the light passing through the pass polarization. As shown in plot 500 of FIG. 5, an image 510 from emission 310 may form at the user's retina, and non-image light may be shown by the irradiance of area 520.

Figure 6:
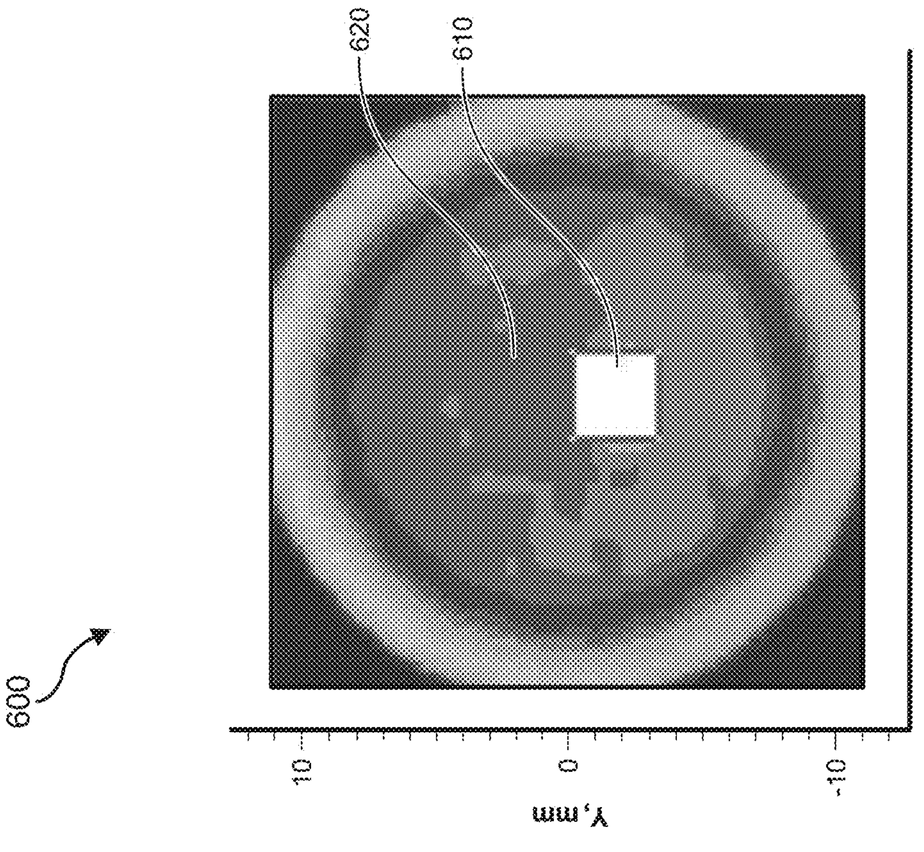
FIG. 6 illustrates another example image formed at a user's retina from another modified version of the example emission of FIG. 3.

FIG. 6 illustrates another example image formed at a user's retina from another modified version of the example emission of FIG. 3. In this example provided in FIG. 6, emission 310 may be about 100% brighter than in the example given in FIG. 4. In this example, the absorber (e.g., absorber 235) may absorb 50% of the light passing through the pass polarization. Thus, the modified system may have four times the contrast of the system shown in FIG. 4. As shown in plot 600 of FIG. 6, an image 610 from emission 310 may form at the user's retina, and non-image light may be shown by the irradiance of area 620.

Figure 7:
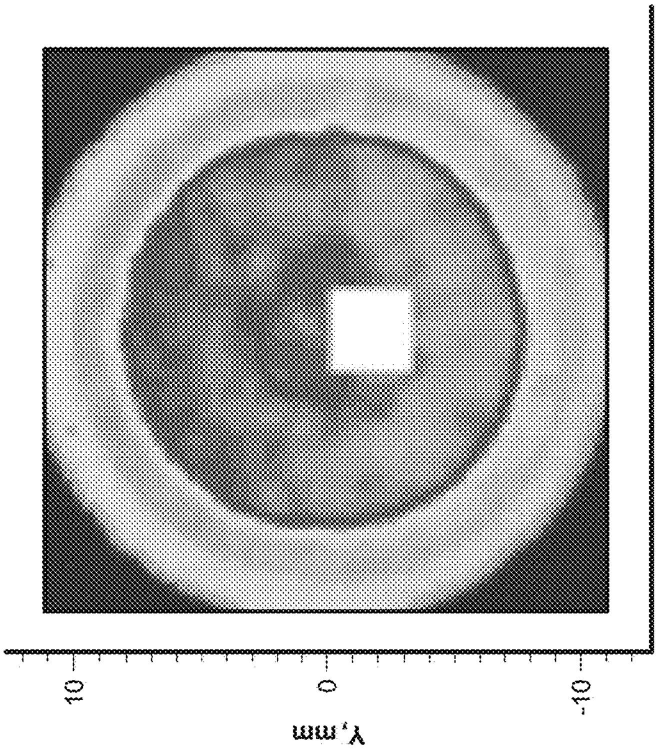
FIG. 7 illustrates an example image formed at a user's retina as in FIG. 4 with a modified version of the high-contrast pancake lens with pass-polarization absorber of FIG. 2.

FIG. 7 illustrates an example image formed at a user's retina as in FIG. 4 with a modified version of the high-contrast pancake lens with pass-polarization absorber of FIG. 2. In the example provided in FIG. 7, a quarterwave retarder may be added to device 200 of FIG. 2 between the user's eye 240 and the absorber 235.

Figure 8:
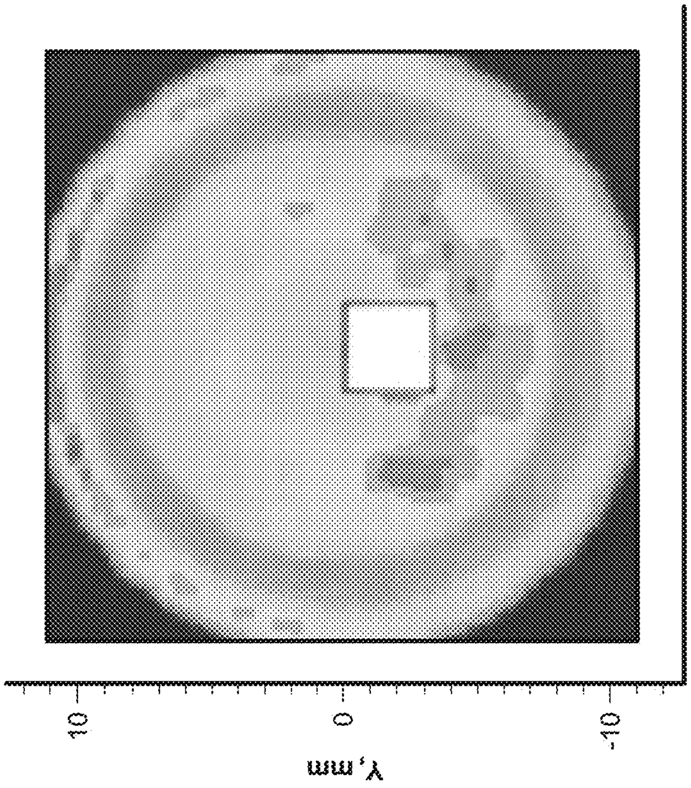
FIG. 8 illustrates an example image formed at a user's retina as in FIG. 5 with a modified version of the high-contrast pancake lens with pass-polarization absorber of FIG. 2.

FIG. 8 illustrates an example image formed at a user's retina as in FIG. 5 with a modified version of the high-contrast pancake lens with pass-polarization absorber of FIG. 2. In the example provided in FIG. 8, a quarterwave retarder may be added to device 200 of FIG. 2 between the user's eye 240 and the absorber 235.

Figure 9:
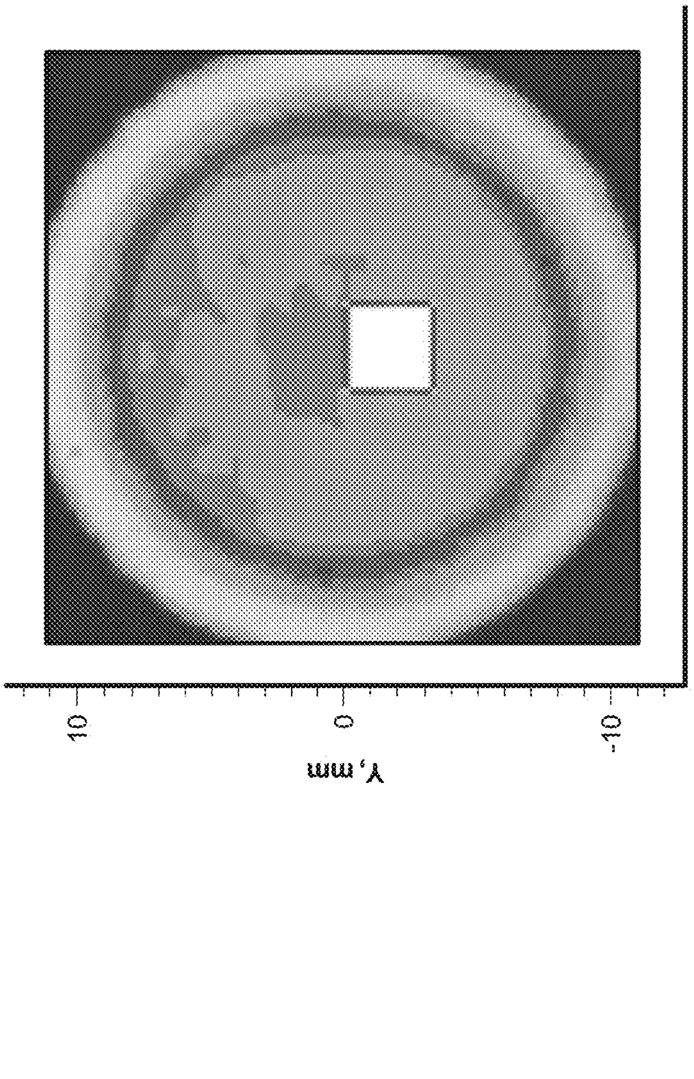
FIG. 9 illustrates an example image formed at a user's retina as in FIG. 6 with a modified version of the high-contrast pancake lens with pass-polarization absorber of FIG. 2.

FIG. 9 illustrates an example image formed at a user's retina as in FIG. 6 with a modified version of the high-contrast pancake lens with pass-polarization absorber of FIG. 2. In the example provided in FIG. 9, a quarterwave retarder may be added to device 200 of FIG. 2 between the user's eye 240 and the absorber 235.

Figure 10:
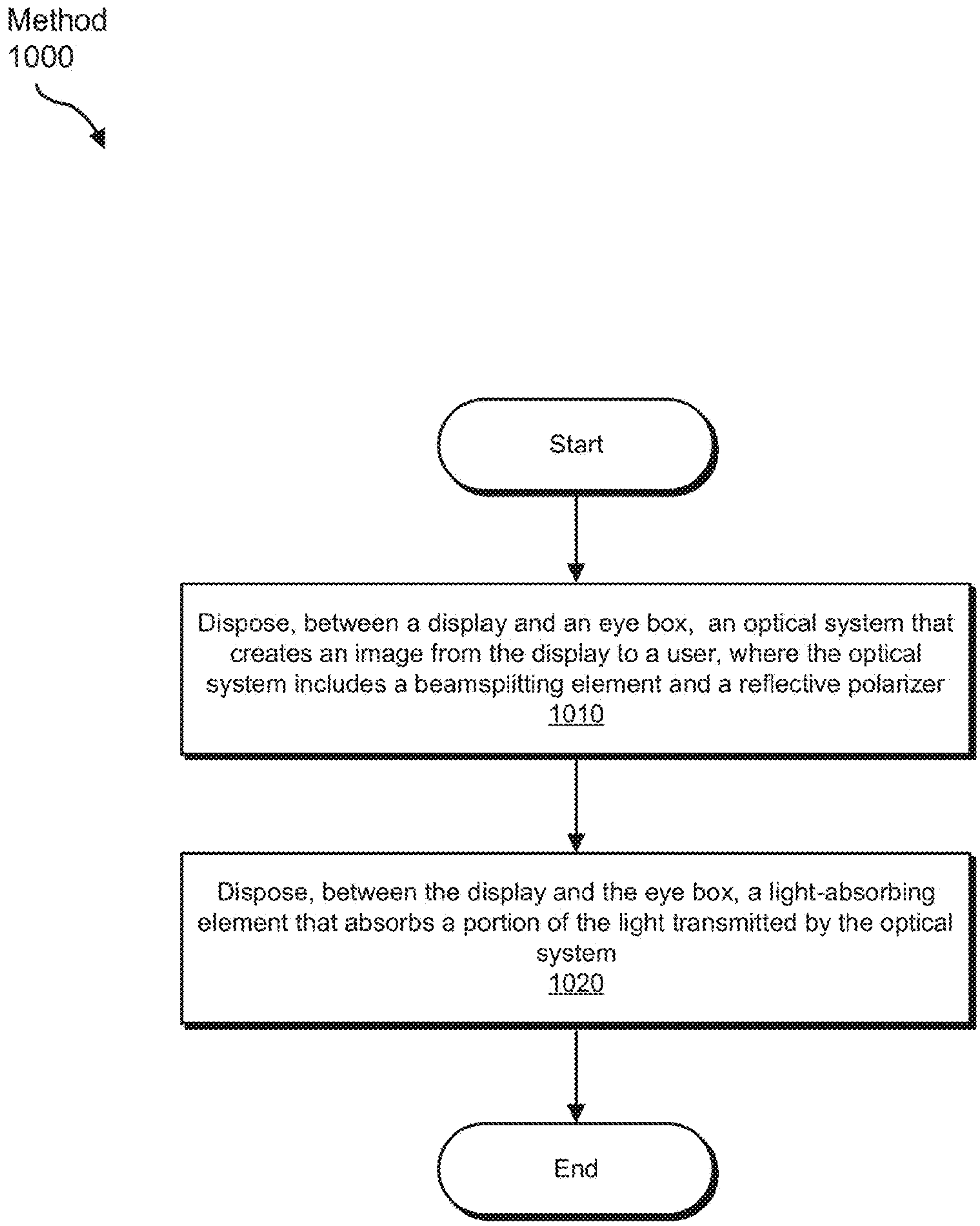
FIG. 10 is a flow diagram of an example method of manufacture for high-contrast pancake lenses with pass-polarization absorbers.

FIG. 10 is a flow diagram of an example method of manufacture 1000 for high-contrast pancake lenses with pass-polarization absorbers. As shown in FIG. 10, at step 1010 method 1000 may include disposing, between a display and an eye box, an optical system that creates an image from the display to a user, where the optical system includes a beamsplitting element and a reflective polarizer.

At step 1020 method 1000 may include disposing, between the display and the eye box, a light-absorbing element that absorbs a portion of the light transmitted by the optical system.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 1100 in FIG. 11) or that visually immerses a user in an artificial reality (such as, e.g., virtual-reality system 1200 in FIG. 12). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 11:
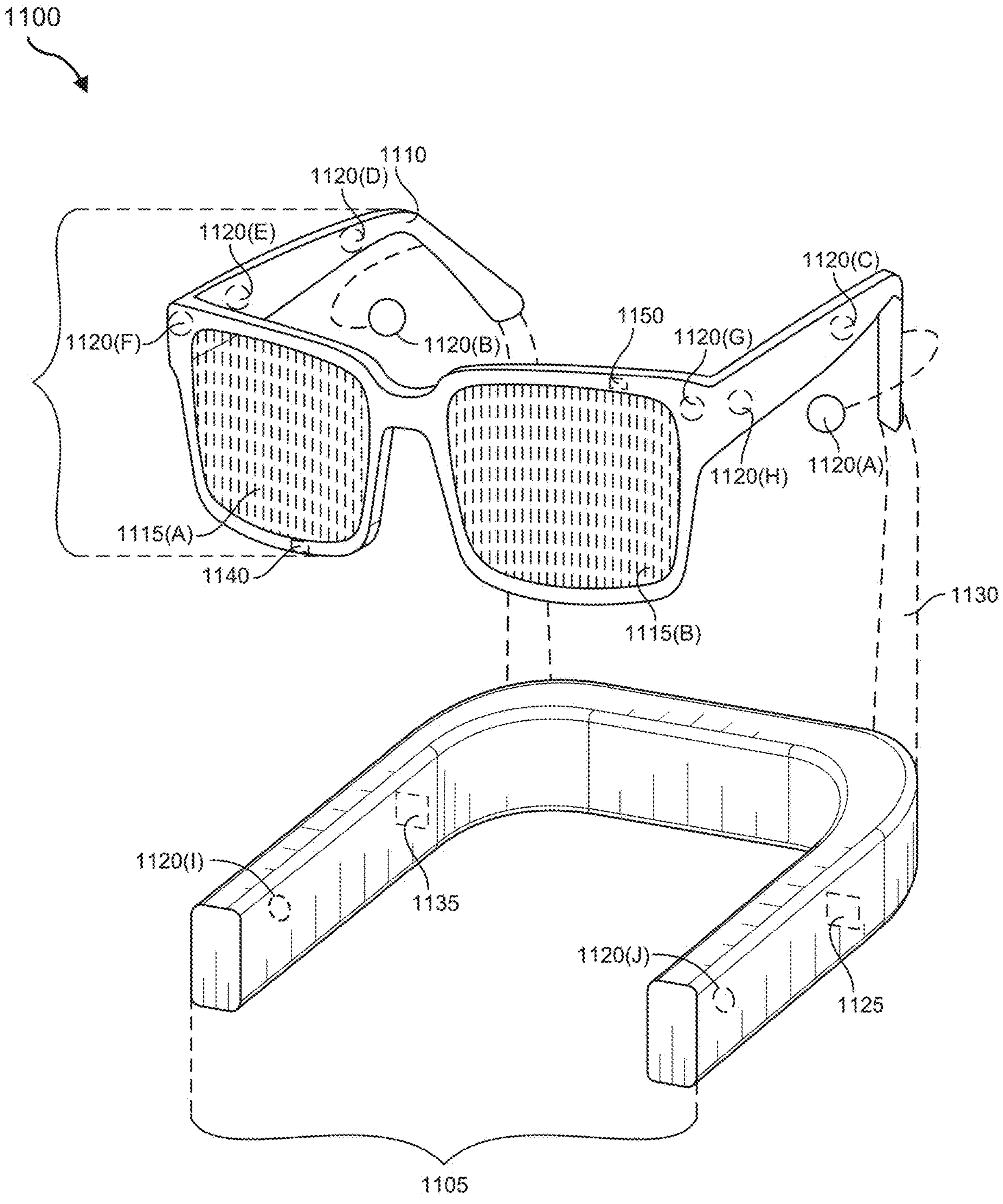
FIG. 11 is an illustration of exemplary augmented-reality glasses that may be used in connection with embodiments of this disclosure.
Figure 12:
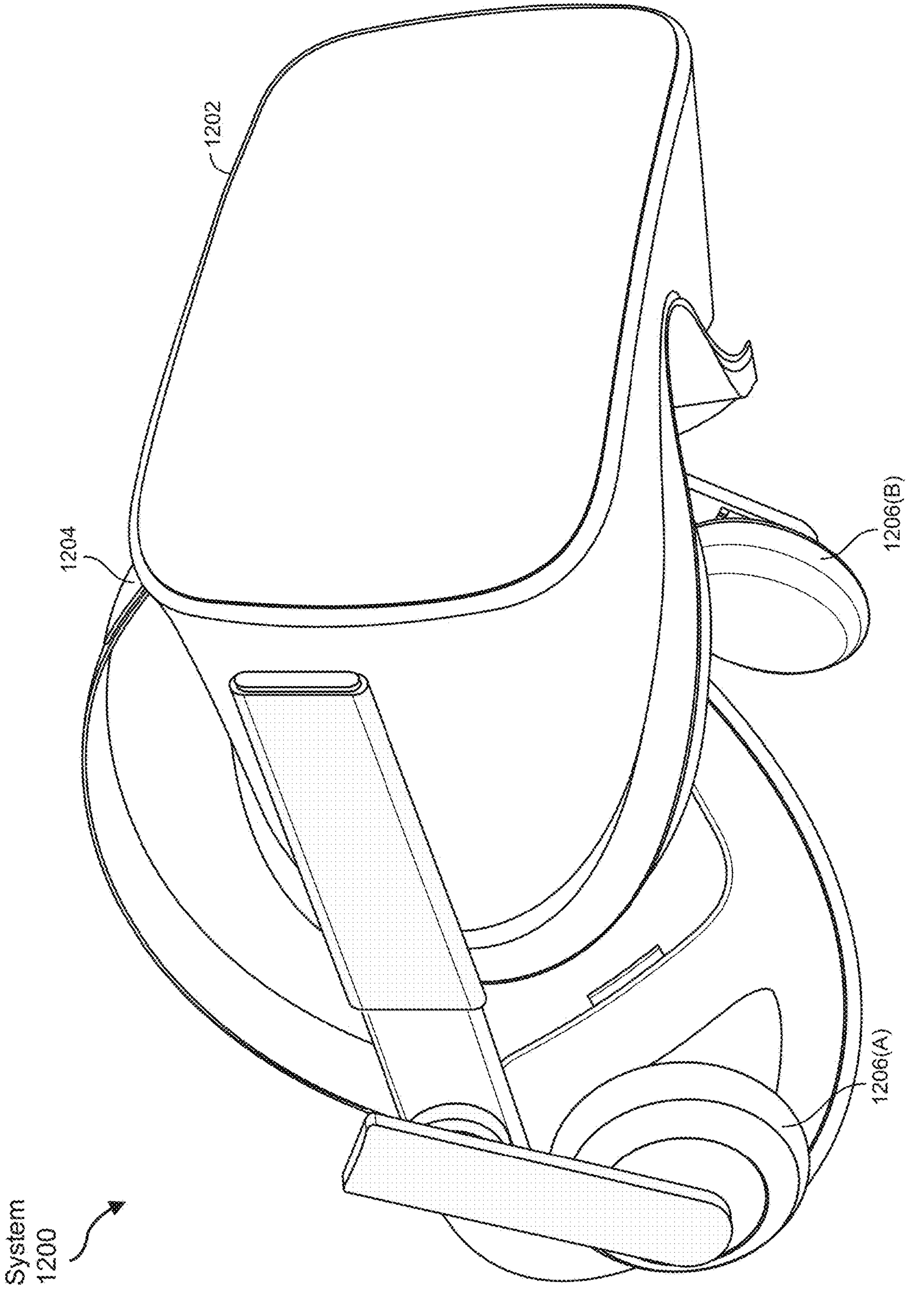
FIG. 12 is an illustration of an exemplary virtual-reality headset that may be used in connection with embodiments of this disclosure.

Turning to FIG. 11, augmented-reality system 1100 may include an eyewear device 1102 with a frame 1110 configured to hold a left display device 1115(A) and a right display device 1115(B) in front of a user's eyes. Display devices 1115(A) and 1115(B) may act together or independently to present an image or series of images to a user. While augmented-reality system 1100 includes two displays, embodiments of this disclosure may be implemented in augmented-reality systems with a single NED or more than two NEDs.

In some embodiments, augmented-reality system 1100 may include one or more sensors, such as sensor 1140. Sensor 1140 may generate measurement signals in response to motion of augmented-reality system 1100 and may be located on substantially any portion of frame 1110. Sensor 1140 may represent one or more of a variety of different sensing mechanisms, such as a position sensor, an inertial measurement unit (IMU), a depth camera assembly, a structured light emitter and/or detector, or any combination thereof. In some embodiments, augmented-reality system 1100 may or may not include sensor 1140 or may include more than one sensor. In embodiments in which sensor 1140 includes an IMU, the IMU may generate calibration data based on measurement signals from sensor 1140. Examples of sensor 1140 may include, without limitation, accelerometers, gyroscopes, magnetometers, other suitable types of sensors that detect motion, sensors used for error correction of the IMU, or some combination thereof.

In some examples, augmented-reality system 1100 may also include a microphone array with a plurality of acoustic transducers 1120(A)-1120(J), referred to collectively as acoustic transducers 1120. Acoustic transducers 1120 may represent transducers that detect air pressure variations induced by sound waves. Each acoustic transducer 1120 may be configured to detect sound and convert the detected sound into an electronic format (e.g., an analog or digital format). The microphone array in FIG. 11 may include, for example, ten acoustic transducers: 1120(A) and 1120(B), which may be designed to be placed inside a corresponding ear of the user, acoustic transducers 1120(C), 1120(D), 1120(E), 1120(F), 1120(G), and 1120(H), which may be positioned at various locations on frame 1110, and/or acoustic transducers 1120(I) and 1120(J), which may be positioned on a corresponding neckband 1105.

In some embodiments, one or more of acoustic transducers 1120(A)-(J) may be used as output transducers (e.g., speakers). For example, acoustic transducers 1120(A) and/or 1120(B) may be earbuds or any other suitable type of headphone or speaker.

The configuration of acoustic transducers 1120 of the microphone array may vary. While augmented-reality system 1100 is shown in FIG. 11 as having ten acoustic transducers 1120, the number of acoustic transducers 1120 may be greater or less than ten. In some embodiments, using higher numbers of acoustic transducers 1120 may increase the amount of audio information collected and/or the sensitivity and accuracy of the audio information. In contrast, using a lower number of acoustic transducers 1120 may decrease the computing power required by an associated controller 1150 to process the collected audio information. In addition, the position of each acoustic transducer 1120 of the microphone array may vary. For example, the position of an acoustic transducer 1120 may include a defined position on the user, a defined coordinate on frame 1110, an orientation associated with each acoustic transducer 1120, or some combination thereof.

Acoustic transducers 1120(A) and 1120(B) may be positioned on different parts of the user's ear, such as behind the pinna, behind the tragus, and/or within the auricle or fossa. Or, there may be additional acoustic transducers 1120 on or surrounding the ear in addition to acoustic transducers 1120 inside the ear canal. Having an acoustic transducer 1120 positioned next to an ear canal of a user may enable the microphone array to collect information on how sounds arrive at the ear canal. By positioning at least two of acoustic transducers 1120 on either side of a user's head (e.g., as binaural microphones), augmented-reality device 1100 may simulate binaural hearing and capture a 3D stereo sound field around about a user's head. In some embodiments, acoustic transducers 1120(A) and 1120(B) may be connected to augmented-reality system 1100 via a wired connection 1130, and in other embodiments acoustic transducers 1120(A) and 1120(B) may be connected to augmented-reality system 1100 via a wireless connection (e.g., a BLUETOOTH connection). In still other embodiments, acoustic transducers 1120(A) and 1120(B) may not be used at all in conjunction with augmented-reality system 1100.

Acoustic transducers 1120 on frame 1110 may be positioned in a variety of different ways, including along the length of the temples, across the bridge, above or below display devices 1115(A) and 1115(B), or some combination thereof. Acoustic transducers 1120 may also be oriented such that the microphone array is able to detect sounds in a wide range of directions surrounding the user wearing the augmented-reality system 1100. In some embodiments, an optimization process may be performed during manufacturing of augmented-reality system 1100 to determine relative positioning of each acoustic transducer 1120 in the microphone array.

In some examples, augmented-reality system 1100 may include or be connected to an external device (e.g., a paired device), such as neckband 1105. Neckband 1105 generally represents any type or form of paired device. Thus, the following discussion of neckband 1105 may also apply to various other paired devices, such as charging cases, smart watches, smart phones, wrist bands, other wearable devices, hand-held controllers, tablet computers, laptop computers, other external compute devices, etc.

As shown, neckband 1105 may be coupled to eyewear device 1102 via one or more connectors. The connectors may be wired or wireless and may include electrical and/or non-electrical (e.g., structural) components. In some cases, eyewear device 1102 and neckband 1105 may operate independently without any wired or wireless connection between them. While FIG. 11 illustrates the components of eyewear device 1102 and neckband 1105 in example locations on eyewear device 1102 and neckband 1105, the components may be located elsewhere and/or distributed differently on eyewear device 1102 and/or neckband 1105. In some embodiments, the components of eyewear device 1102 and neckband 1105 may be located on one or more additional peripheral devices paired with eyewear device 1102, neckband 1105, or some combination thereof.

Pairing external devices, such as neckband 1105, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 1100 may be provided by a paired device or shared between a paired device and an eyewear device, thus reducing the weight, heat profile, and form factor of the eyewear device overall while still retaining desired functionality. For example, neckband 1105 may allow components that would otherwise be included on an eyewear device to be included in neckband 1105 since users may tolerate a heavier weight load on their shoulders than they would tolerate on their heads. Neckband 1105 may also have a larger surface area over which to diffuse and disperse heat to the ambient environment. Thus, neckband 1105 may allow for greater battery and computation capacity than might otherwise have been possible on a stand-alone eyewear device. Since weight carried in neckband 1105 may be less invasive to a user than weight carried in eyewear device 1102, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 1105 may be communicatively coupled with eyewear device 1102 and/or to other devices. These other devices may provide certain functions (e.g., tracking, localizing, depth mapping, processing, storage, etc.) to augmented-reality system 1100. In the embodiment of FIG. 11, neckband 1105 may include two acoustic transducers (e.g., 1120(I) and 1120(J)) that are part of the microphone array (or potentially form their own microphone subarray). Neckband 1105 may also include a controller 1125 and a power source 1135.

Acoustic transducers 1120(I) and 1120(J) of neckband 1105 may be configured to detect sound and convert the detected sound into an electronic format (analog or digital). In the embodiment of FIG. 11, acoustic transducers 1120(I) and 1120(J) may be positioned on neckband 1105, thereby increasing the distance between the neckband acoustic transducers 1120(I) and 1120(J) and other acoustic transducers 1120 positioned on eyewear device 1102. In some cases, increasing the distance between acoustic transducers 1120 of the microphone array may improve the accuracy of beamforming performed via the microphone array. For example, if a sound is detected by acoustic transducers 1120(C) and 1120(D) and the distance between acoustic transducers 1120(C) and 1120(D) is greater than, e.g., the distance between acoustic transducers 1120(D) and 1120(E), the determined source location of the detected sound may be more accurate than if the sound had been detected by acoustic transducers 1120(D) and 1120(E).

Controller 1125 of neckband 1105 may process information generated by the sensors on neckband 1105 and/or augmented-reality system 1100. For example, controller 1125 may process information from the microphone array that describes sounds detected by the microphone array. For each detected sound, controller 1125 may perform a direction-of-arrival (DOA) estimation to estimate a direction from which the detected sound arrived at the microphone array. As the microphone array detects sounds, controller 1125 may populate an audio data set with the information. In embodiments in which augmented-reality system 1100 includes an inertial measurement unit, controller 1125 may compute all inertial and spatial calculations from the IMU located on eyewear device 1102. A connector may convey information between augmented-reality system 1100 and neckband 1105 and between augmented-reality system 1100 and controller 1125. The information may be in the form of optical data, electrical data, wireless data, or any other transmittable data form. Moving the processing of information generated by augmented-reality system 1100 to neckband 1105 may reduce weight and heat in eyewear device 1102, making it more comfortable to the user.

Power source 1135 in neckband 1105 may provide power to eyewear device 1102 and/or to neckband 1105. Power source 1135 may include, without limitation, lithium ion batteries, lithium-polymer batteries, primary lithium batteries, alkaline batteries, or any other form of power storage. In some cases, power source 1135 may be a wired power source. Including power source 1135 on neckband 1105 instead of on eyewear device 1102 may help better distribute the weight and heat generated by power source 1135.

As noted, some artificial-reality systems may instead of blending an artificial reality with actual reality, substantially replace one or more of a user's sensory perceptions of the real world with a virtual experience. One example of this type of system is a head-worn display system, such as virtual-reality system 1200 in FIG. 12, that mostly or completely covers a user's field of view. Virtual-reality system 1200 may include a front rigid body 1202 and a band 1204 shaped to fit around a user's head. Virtual-reality system 1200 may also include output audio transducers 1206(A) and 1206(B). Furthermore, while not shown in FIG. 12, front rigid body 1202 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 1100 and/or virtual-reality system 1200 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 1100 and/or virtual-reality system 1200 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 1100 and/or virtual-reality system 1200 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to any claims appended hereto and their equivalents in determining the scope of the present disclosure.

Unless otherwise noted, the terms "connected to" and "coupled to" (and their derivatives), as used in the specification and/or claims, are to be construed as permitting both direct and indirect (i.e., via other elements or components) connection. In addition, the terms "a" or "an," as used in the specification and/or claims, are to be construed as meaning "at least one of." Finally, for ease of use, the terms "including" and "having" (and their derivatives), as used in the specification and/or claims, are interchangeable with and have the same meaning as the word "comprising."

What is claimed is:

1. A device comprising:

an optical system that creates an image to a user, wherein the optical system comprises:
- a beamsplitting element; and
- a reflective polarizer that reflects a first handedness of circularly polarized light and transmits a second handedness of polarized light; and a light-absorbing element absorbs a portion of the light transmitted by the optical system, wherein the light-absorbing element has a higher absorptivity of the light at a center of the light-absorbing element than at 50% of an outer radius of an edge by at least 10%.

2. The device of claim 1, wherein the reflective polarizer comprises a cholesteric reflective polarizer.

3. The device of claim 1, wherein the reflective polarizer comprises:

a linear reflective polarizer; and a retarder.

4. The device of claim 3, wherein the linear reflective polarizer comprises at least one of:

a birefringent polymer multilayer optical film; or a wire grid.

5. The device of claim 1, wherein the absorbed portion of light is greater than at least one of:

10% of the light;

20% of the light;

30% of the light;

40% of the light; or

50% of the light.

6. The device of claim 1, wherein the light-absorbing element in pass-polarization has higher optical transparency for wavelengths emitted by a display than for photopically weighted white light.

7. The device of claim 1, wherein the light-absorbing element in pass-polarization has lower absorption for wavelengths of about 460 nanometers, about 520 nanometers, and about 615 nanometers than for other wavelengths.

8. The device of claim 1, wherein the light-absorbing element is between the reflective polarizer and a location for a user's eye.

9. The device of claim 1, wherein the light-absorbing element is between the reflective polarizer and the beam-splitting element.

10. The device of claim 1, wherein the light-absorbing element has the higher absorptivity at the center than at 50% of the outer radius of the edge by at least one of:

20% or more; or

30% or more.

11. A system comprising:

a display;

an optical system that creates an image from the display to a user, wherein the optical system comprises:

a beamsplitting element; and a reflective polarizer that reflects a first handedness of circularly polarized light and transmits a second handedness of polarized light; and a light-absorbing element absorbs a portion of the light transmitted by the optical system, wherein the light-absorbing element has a higher absorptivity of the light at a center of the light-absorbing element than at 50% of an outer radius of an edge by at least 10%.

12. The system of claim 11, wherein the reflective polarizer comprises a cholesteric reflective polarizer.

13. The system of claim 11, wherein the reflective polarizer comprises:

a linear reflective polarizer; and a retarder.

14. The system of claim 13, wherein the linear reflective polarizer comprises at least one of:

a birefringent polymer multilayer optical film; or a wire grid.

15. The system of claim 11, wherein the absorbed portion of light is greater than 10% of the light.

16. The system of claim 11, wherein the light-absorbing element in pass-polarization has higher optical transparency for wavelengths emitted by the display than for photopically weighted white light.

17. The system of claim 11, wherein the light-absorbing element in pass-polarization has lower absorption for wavelengths of about 460 nanometers, about 520 nanometers, and about 615 nanometers than for other wavelengths.

18. The system of claim 11, wherein the light-absorbing element is between the reflective polarizer and a location for a user's eye.

19. The system of claim 11, wherein the light-absorbing element is between the reflective polarizer and the beam-splitting element.

20. A method of manufacture comprising:

disposing, between a display and an eye box, an optical system that creates an image from the display to a user, wherein the optical system comprises:

a beamsplitting element; and a reflective polarizer that reflects a first handedness of circularly polarized light and transmits a second handedness of polarized light; and disposing, between the display and the eye box, a light-absorbing element absorbs a portion of the light transmitted by the optical system, wherein the light-absorbing element has a higher absorptivity of the light at a center of the light-absorbing element than at 50% of an outer radius of an edge by at least 10%.

* * * * *